United States Patent [19]

Giddings et al.

[11] 3,914,337
[45] Oct. 21, 1975

[54] POLYBLENDS COMPRISING S-A COPOLYMER AND GRAFT COPOLYMER OF S-A-ACRYLATE ONTO A DIENE RUBBER

[75] Inventors: Brandford E. Giddings, Warrensville Heights; Irving Rosen, Painesville, both of Ohio

[73] Assignee: The Standard Oil Company, Cleveland, Ohio

[22] Filed: May 2, 1973

[21] Appl. No.: 356,581

Related U.S. Application Data

[63] Continuation-in-part of Ser. No. 325,205, Jan. 19, 1973, abandoned.

[52] U.S. Cl. .................. 260/876 R; 260/880 R
[51] Int. Cl.² ............................................ C08L 51/04
[58] Field of Search ................. 260/876 R, 880 R

[56] References Cited
UNITED STATES PATENTS

| | | |
|---|---|---|
| 3,336,417 | 8/1967 | Sakuma et al. .................. 260/880 |
| 3,524,536 | 8/1970 | Terenzi et al. .................. 206/45.31 |
| 3,720,340 | 3/1973 | Lee et al. ............................ 215/1 C |

FOREIGN PATENTS OR APPLICATIONS

| | | | |
|---|---|---|---|
| 965,851 | 8/1964 | United Kingdom ............ | 260/876 R |
| 731,736 | 4/1966 | Canada .......................... | 260/876 R |

*Primary Examiner*—Murray Tillman
*Assistant Examiner*—C. J. Seccuro
*Attorney, Agent, or Firm*—John F. Jones; Sherman J. Kemmer

[57] ABSTRACT

Clear, impact-resistant polymers having low permeability to gases and vapors are prepared by blending a resinous copolymer of acrylonitrile and styrene with a copolymer of acrylonitrile, styrene, and an acrylate ester prepared in the presence of a diene elastomer.

10 Claims, No Drawings

POLYBLENDS COMPRISING S-A COPOLYMER AND GRAFT COPOLYMER OF S-A-ACRYLATE ONTO A DIENE RUBBER

This is a continuation-in-part application of our co-pending U.S. pat application Ser. No. 325,205 filed Jan. 19, 1973, now abandoned.

The present invention relates to novel polymeric compositions which when molded are clear, impact-resistant, and have low permeability to gases and vapors, and more particularly pertains to clear, impact-resistant polymeric compositions which function as gas and vapor barrier materials and are composed of a conjugated diene monomer, acrylonitrile, styrene, and a lower alkyl acrylate ester, and to the process for preparing these compositions.

The novel polymeric products of the present invention are prepared by blending (1) a resinous copolymer of acrylonitrile, styrene, and optionally a lower alkyl ester of an olefinically unsaturated carboxylic acid with (2) a polymerization product of acrylonitrile, styrene, and a lower alkyl ester of an olefinically unsaturated carboxylic acid, and a rubber composed of the polymerization product of a major proportion of a conjugated diene monomer and a minor proportion of at least one member selected from the group consisting of an olefinically unsaturated nitrile and styrene.

The conjugated diene monomers useful in the present invention include butadiene-1,3, isoprene, chloroprene, bromoprene, cyanoprene, 2,3-dimethyl-butadiene-1,3 2-ethyl-butadiene-1,3, 2,3-diethyl-butadiene-1,3, and the like, and others. Most preferred for the purpose of this invention are butadiene and isoprene because of their ready availability and their excellent copolymerization properties.

The olefinically unsaturated nitriles useful in the present invention are the alpha,beta-olefinically unsaturated mononitriles having the structure

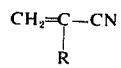

wherein R is hydrogen, a lower alkyl group having from 1 to 4 carbon atoms, or a halogen. such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile, and mixtures thereof.

The lower alkyl esters of olefinically unsaturated carboxylic acids useful in the present invention are preferably the lower alkyl esters of alpha,beta-olefinically unsaturated carboxylic acids, and more preferred are the esters having the structure

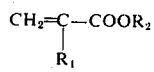

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, and methyl methacrylate.

The components of the polymeric compositions of the present invention can be prepared by any of the known general techniques of polymerization including bulk polymerization, solution polymerization, and emulsion or suspension polymerization techniques by batch, continuous or intermittent addition of the monomers and other components. The preferred method is polymerization in an aqueous medium such as in an aqueous emulsion or suspension polymerization. The polymerization is preferably carried out in an aqueous medium in the presence of an emulsifier and a free-radical generating polymerization initiator at a temperature of from about 0° to 100°C in the substantial absence of molecular oxygen.

The most preferred polymeric compositions embodied herein are those resulting from blending (A) a polymer resulting from the polymerization of (1) from about 70 to 90% by weight of an alpha,beta-olefinically unsaturated mononitrile having the structure

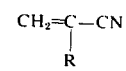

wherein R is a member selected from the group consisting of hydrogen, a lower alkyl group having from 1 to 4 carbon atoms and a halogen, and (2) from 10 to 30% by weight based on the combined weights of (1) and (2) of sytrene with (B) a polymer resulting from the polymerization of 100 parts by weight of (1) 50 to 90% by weight of an alpha,beta-olefinically unsaturated mononitrile having the structure

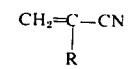

wherein R has the foregoing designation, (2) from 1 to 35% by weight of styrene, and (3) from 2 to 29% by weight of an ester of an olefinically unsaturated carboxylic acid having the structure

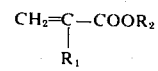

wherein $R_1$ and $R_2$ have the foregoing designations in the presence of from 20 to 600 parts by weight of (4) a rubbery copolymer of a conjugated diene monomer selected from the group consisting of butadiene and isoprene and at least one member selected from the group consisting of an olefinically unsaturated mononitrile having the structure

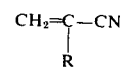

wherein R has the foregoing designation and styrene, said rubbery copolymer containing from 50 to 95% by weight of polymerized conjugated diene monomer and from 50 to 5% by weight of polymerized olefinically unsaturated nitrile or styrene or both. The preferred polymeric compositions of this invention contain from 60 to 90% by weight of (A) and correspondingly from 40 to 10% by weight of (B).

The blended polymeric compositions embodied in this invention can be prepared by blending the (A) and (B) components in latex form or by intimately mixing the dry (A) and (B) components on a rubber mill, in an internal mixer, or other known polymer mixing means. The blends can also be prepared by mixing the (A) and (B) components in solution or by adding either the solid (A) or (B) component to the other which is dissolved in a solvent therefor. In the most preferred procedure, the polymer blends are made by combining the aqueous latices of components (A) and (B).

The novel polymeric products of the present invention are thermoplastic materials which can be thermoformed into a wide variety of useful articles in any of the conventional ways employed with known thermoplastic polymer materials such as by extrusion, milling, molding, drawing, blowing, etc. The polymeric products of this invention have excellent solvent resistance, and their impact strength and low permeability to gases and vapors make them very useful in the packaging industry, and they are particularly useful in the manufacture of bottles, film, and other types of containers for liquids and solids.

This invention is further illustrated in the following examples in which the amounts of the various materials mentioned are expressed in parts by weight unless otherwise specified.

EXAMPLE 1

A. A resin was prepared from the following recipe:

| Ingredient | Parts |
| --- | --- |
| acrylonitrile | 75 |
| styrene | 25 |
| water | 300 |
| Alipal CO-436* | 1.5 |
| t-dodecyl mercaptan | 1.7 |

*Ammonium salt of sulfated nonyl phenoxy poly(ethyleneoxy) ethanol.

The water and emulsifier (Alipal CO-436) were mixed and the resulting solution, which had a pH of about 6.6, was transferred to the polymerization reactor. Potassium persulfate (0.05 parts) was then added with stirring and the reactor was purged with nitrogen for 10 minutes. The mixture was then brought to and maintained at 70°C and the feed, which was composed of acrylonitrile, styrene, and t-dodecyl mercaptan, was added to the stirred reactor mixture at a controlled rate so that a time of 5½ hours was required for completion of the addition of the feed material. The final latex was obtained in about 95% conversion of monomers to polymer. A part of this latex was coagulated and the resin was isolated and dried. The dried polymer was found to have the following physical properties:

| | |
| --- | --- |
| ASTM heat distortion temperature | 92°C |
| notched Izod impact strength | 0.13 foot pounds per inch of notch |
| flexural strength | $14 \times 10^3$ psi |
| flexural modulus | $5.60 \times 10^5$ psi |
| tensile strength | $9.78 \times 10^3$ psi |
| clarity | excellent |
| Brabender plasticorder torque | 1500 meter grams |

B. A rubber latex was prepared by polymerizing, with continuous agitation at 45°C in the substantial absence of oxygen, a mixture of the following ingredients:

| Ingredient | Parts |
| --- | --- |
| acrylonitrile | 35 |
| butadiene | 65 |
| fatty-acid soap | 1.4 |
| azobisisobutyronitrile | 0.3 |
| t-dodecyl mercaptan | 0.5 |
| water | 200 |

The polymerization was carried out for about 22 hours to a conversion of 92% and a total solids of 33%.

C. A graft polymer was prepared by the polymerization of the following ingredients:

| Ingredient | Parts |
| --- | --- |
| water | 300 |
| rubber latex (B of this example) | 50 to 70 |
| Alipal CO-436 | 3 |
| acrylonitrile | 75 |
| styrene | 5 |
| methyl acrylate | 20 |
| limonene dimercaptan | 2 |
| potassium persulfate | 0.15 |

The water and emulsifier (Alipal CO-436) were mixed and the pH of the mixture was adjusted to 7 with dilute alkali. The rubber latex was added to this mixture and the pH was again adjusted to 7 using dilute hydrochloric acid. This mixture was then added to the polymerization reactor which had already been charged with the other ingredients. Mixing was commenced and the reactor was purged with nitrogen for 10 minutes. The reactor contents were then brought to 65°C and maintained at this temperature during the polymerization time of 5 hours. The polymerization was carried to about 95% conversion.

D. Latices of A and C above were blended to form blends having rubber contents of 12, 14, and 16% by weight based on the total weight of the resin. The resulting blends were coagulated in boiling water containing aluminum sulfate to yield 95 to 100% of final resin product. The physical properties of these blends are given in Table 1.

Table 1

| Blend, Solids Basis A/C | ASTM HDT* | Flexural Strength ($\times 10^3$ psi) | Flexural Modulus ($\times 10^5$ psi) | Tensile Strength ($\times 10^3$ psi) | Notched Izod Impact Strength (ft lbs/inch of notch) | Brabender Plasticorder Torque (meter grams) | Rubber in Blend |
| --- | --- | --- | --- | --- | --- | --- | --- |
| 47/25 | 91°C | 11.1 | 4.87 | 7.19 | 1.02 | 1750 | 12% |
| 52.4/20 | 90°C | 14.8 | 4.80 | 10.20 | 1.10 | 1950 | 12% |
| 34.4/20 | 88°C | 6.6 | 4.31 | 8.46 | 0.97 | 1550 | 16% |
| 47.5/25 | 86°C | 14.7 | 4.30 | 11.10 | 1.56 | 1580 | 12% |
| 52.25/25 | 87°C | 13.7 | 3.81 | 10.60 | 1.45 | 2000 | 14% |

*ASTM Heat Distortion Temperature

EXAMPLE 2

A. An acrylonitrile-styrene resin in latex form was prepared from the following ingredients:

| Ingredient | Parts |
|---|---|
| water | 250 |
| Gafac RE-610* | 0.6 |
| G-1300** | 1.4 |
| acrylonitrile | 75 |
| styrene | 25 |
| limonene dimercaptan | 1 |
| ammonium persulfate | 0.05/50 phm water |

*A mixture of $R-O-(CH_2CH_2O-)_nPO_3M_2$ and $[R-O-(CH_2CH_2O-)_n]_2PO_3M$ wherein n is a number from 1 to 40, R is an alkyl or alkaryl group and preferably a nonyl phenyl group, and M is hydrogen, ammonia or an alkali metal. This material is sold by GAF Corporation.
**A polyoxyethylene glyceride ester.

The emulsifiers, Gafac RE-610 and G-1300, were dissolved in the water and the pH of the resulting solution was adjusted to 6–7 with dilute aqueous KOH. This solution was stirred and purged with nitrogen for about 20 minutes. The solution was then heated to 70°C and the mixture of acrylonitrile, styrene, and limonene dimercaptan was then added continuously and in a separate stream was added continuously the ammonium persulfate-water solution. Addition of the monomers and catalyst required about 5 hours. A latex resulted which represented about 95% conversion of monomers to polymer.

B. An elastomer of butadiene-acrylonitrile and styrene was prepared as follows using the following ingredients:

| Ingredient | Parts |
|---|---|
| water | 175 |
| Gafac RS-710* | 1.0 |
| Hampol K₃120** | 0.1 |
| styrene | 20 |
| acrylonitrile | 5 |
| butadiene | 75 |
| azobisisobutyronitrile | 0.25 |
| t-dodecyl mercaptan | 0.5 |

*Tridecyl polyethyleneoxy phosphate.
**N-hydroxyethyl ethylene diamine triacetic acid.

The polymerization was carried out with agitation at 60°C for about 16 hours to give a conversion of about 87% of monomers to polymer. The product was in the form of a latex.

C. A graft of a monomer mixture of acrylonitrile, styrene, and methyl acrylate onto the rubber of B above was prepared from the following ingredients:

| Ingredient | Parts |
|---|---|
| water | 200 |
| Gafac RE-610 | 1 |
| elastomer B (latex) | 60 |
| acrylonitrile | 55 |
| styrene | 31 |
| methyl acrylate | 14 |
| limonene dimercaptan | 0.5 |
| ammonium persulfate | 0.3 |

The Gafac RE-610 was dissolved in the water and the pH of the solution was adjusted to 6–7 with dilute aqueous KOH. The elastomer B latex was then added and the mixture was stirred and purged with nitrogen for 20 minutes. The mixture was then heated to 65°C and the persulfate catalyst was added with continued stirring. The mixture of acrylonitrile, styrene, methyl acrylate, and limonene dimercaptan was added continuously over a 4-hour period at 65°C. After completion of the addition of the monomers the reaction was allowed to continue with stirring at 65°C for an additional hour.

D. Latices of A and C of this example were mixed so as to achieve a final rubber level of 12% in the resin. The blended latices were coagulated in an aqueous alum solution at 90° to 95°C. The resin was dried and was found to have the following properties:

| | |
|---|---|
| ASTM heat distortion temperature | 97°C (66 psi) |
| | 87°C (264 psi) |
| notched Izod impact strength | 1.04 foot pounds per inch of notch |
| flexural strength | $15 \times 10^3$ psi |
| flexural modulus | $4.5 \times 10^5$ psi |
| tensile strength | $10.2 \times 10^3$ psi |
| ASTM D-1003 haze | 21.2 |
| ASTM D-1003 transmission | 83.7% |
| yellowness index (ASTM D-1925) | 22.7 |

E. The procedure of C of this example was repeated except that 45 parts of styrene and no methyl acrylate were used in the graft polymerization.

F. The latices of A and E of this example were mixed so as to achieve a final rubber level of 12% in the resin. The blended latices were coagulated in an aqueous alum solution at 90° to 95°C. The resin was dried and was found to have the following properties:

| | |
|---|---|
| notched Izod impact strength | 0.75 foot pounds per inch of notch |
| ASTM D-1003 haze | 42.8 |
| ASTM D-1003 transmission | 73.7% |
| yellowness index (ASTM D-1925) | 52.2 |

Thus, it can be seen by direct comparison that this resin, which is outside the scope of the present invention, is inferior to the resins of this invention as exemplified in D of this example.

EXAMPLE 3

A. The procedure of Example 1-A was repeated to produce a latex of an acrylonitrile/styrene copolymer.

B. The procedure of Example 1-B was repeated except that 25 parts of styrene and 75 parts of butadiene were used in the polymerization.

C. The procedure of Example 1-C was repeated using latex B above instead of latex B of Example 1.

D. Latices A and C above were blended to form blends having rubber contents of 10 and 14% by weight based on the total weight of the final resin. The resulting blends were coagulated in boiling water containing aluminum sulfate to yield 95 to 100% of final resin product. The physical properties of these blends are given in Table 2.

Table 2

| ASTM HDT | Flexural Strength ($\times 10^3$ psi) | Flexural Modulus ($\times 10^5$ psi) | Tensile Strength ($\times 10^3$ psi) | Notched Izod Impact Strength (ft lbs/inch) of notch) | Transmission | Haze | Yellowness Index | Rubber in Blend |
|---|---|---|---|---|---|---|---|---|
| 89°C | 13.4 | 4.49 | 10.20 | 0.80 | 85.7% | 11.6 | 18.8 | 10% |
| 89°C | — | 4.03 | 14.17 | 2.18 | 82.8% | 12.7 | 21.2 | 14% |

EXAMPLE 4

A. The procedure of Example 2-A was repeated.
B. The procedure of Example 2-B was repeated.
C. The procedure of Example 2-C was repeated.
D. Latices A and C of this example were mixed so as to achieve final rubber levels of 10 and 14% in the resin. The blended latices were coagulated in an aqueous alum solution at 90° to 95°C. The final resin was dried and was found to have the physical properties shown in Table 3.

Table 3

| ASTM HDT | Flexural Strength ($\times 10^3$ psi) | Flexural Modulus ($\times 10^5$ psi) | Tensile Strength ($\times 10^3$ psi) | Notched Izod Impact Strength (ft lbs/inch) of notch) | Transmission | Haze | Yellowness Index | Rubber in Blend |
|---|---|---|---|---|---|---|---|---|
| 92°C | 12.1 | 4.44 | 12.0 | 0.75 | 88.2% | 5.7 | 17.8 | 10% |
| 90°C | 10.8 | 3.98 | 11.0 | 2.50 | 89.1% | 4.8 | 16.3 | 14% |

EXAMPLE 5

A. The procedure of Example 1-A was repeated.
B. The procedure of Example 1-B was repeated using the following recipe:

| Ingredient | Parts |
|---|---|
| water | 200 |
| butadiene | 75 |
| styrene | 25 |
| t-dodecyl mercaptan | 0.7 |
| P & G soap flakes | 1.7 |
| Daxad 11* | 0.1 |
| potassium persulfate | 0.2 |

*Naphthalene sulfonic acid-formaldehyde condensate-sodium salt.

C. A graft polymer was prepared by the polymerization of the following ingredients:

| Ingredient | Parts |
|---|---|
| water | 50 |
| Gafac RE-610 | 0.5 |
| latex B (rubber solids basis) | 80 |
| acrylonitrile | 11 |
| styrene | 6.2 |
| methyl acrylate | 2.8 |
| pentaerythritol tetra kis-(2 mercapto propionate) (modifier) | 0.5 |
| ammonium persulfate | 0.1 |

The pH was adjusted to about 5 with citric acid. The reaction was carried out at 65°C in the substantial absence of molecular oxygen. The monomer-modifier mixture was fed continuously to the reactor mixture over a 2-hour period. A conversion of 90% was achieved.

D. A blend of A/C was prepared in the solids weight ratio of 682/100. The coagulated polyblend was found to have a Brabender plasticorder torque of 1690 meter grams, a heat distortion temperature of 86°C, a notched Izod impact strength of 1.1 foot pounds per inch of notch, and excellent clarity and little or no color. The final resin was found to contain about 11% by weight of the butadiene-styrene rubber.

We claim:

1. The polymeric composition resulting from blending
   A. a polymer resulting from the polymerization of a monomer component consisting of
      1. from about 70 to 90% by weight of an alpha, beta-olefinically unsaturated mononitrile having the structure

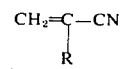

wherein R is a member selected from the group consisting of hydrogen, a lower alkyl group having from 1 to 4 carbon atoms and a halogen, and
      2. from 10 to 30% by weight based on the combined weights of (1) and (2) of styrene with
   B. a polymer resulting from the polymerization of 100 parts by weight of
      1. from 50 to 90% by weight of an alpha, beta-olefinically unsaturated mononitrile having the structure

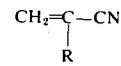

wherein R has the foregoing designation,
      2. from 1 to 35% by weight of styrene, and
      3. from 2 to 29% by weight of an ester of an olefinically unsaturated carboxylic acid having the structure

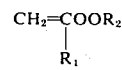

wherein $R_1$ is hydrogen, an alkyl group having from 1 to 4 carbon atoms, and a halogen, and $R_2$ is an alkyl group having from 1 to 6 carbon atoms in the presence of from 20 to 600 parts by weight of
      4. a rubbery copolymer of a conjugated diene monomer selected from the group consisting of butadiene and isoprene and at least one member selected from the group consisting of an olefinically unsaturated mononitrile having the structure

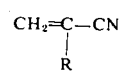

wherein R has the foregoing designation and styrene, said rubbery copolymer containing from 50 to 95% by weight of polymerized conjugated diene monomer and from 50 to 5% by weight of the other monomer component.

2. The composition of claim 1 wherein (A) (1) is acrylonitrile.

3. The composition of claim 2 wherein (B) (1) is acrylonitrile.

4. The composition of claim 3 wherein (B) (3) is methyl acrylate.

5. The composition of claim 4 wherein (B) (4) is a rubbery copolymer of butadiene.

6. The process comprising blending
A. a polymer resulting from the polymerization in an aqueous medium of a monomer component consisting of
   1. from about 70 to 90% by weight of an alpha,-beta-olefinically unsaturated mononitrile having the structure

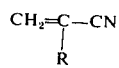

wherein R is a member selected from the group consisting of hydrogen, a lower alkyl group having from 1 to 4 carbon atoms and a halogen, and
   2. from 10 to 30% by weight based on the combined weights of (1) and (2) of styrene with
B. a polymer resulting from the polymerization in an aqueous medium of 100 parts by weight of
   1. from 50 to 90% by weight of an alpha,beta-olefinically unsaturated mononitrile having the structure

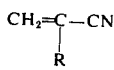

wherein R has the foregoing designation,
   2. from 1 to 35% by weight of styrene, and
   3. from 2 to 29% by weight of an ester of an olefinically unsaturated carboxylic acid having the structure

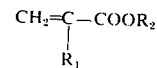

wherein $R_1$ is hydrogen, an alkyl group having from 1 to 4 carbon atoms, and a halogen, and $R_2$ is an alkyl group having from 1 to 6 carbon atoms in the presence of from 20 to 600 parts by weight of
   4. a rubbery copolymer of a conjugated diene monomer selected from the group consisting of butadiene and isoprene and at least one member selected from the group consisting of an olefinically unsaturated mononitrile having the structure

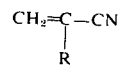

wherein R has the foregoing designation and styrene, said rubbery copolymer containing from 50 to 95% by weight of polymerized conjugated diene monomer and from 50 to 5% by weight of the other monomer component.

7. The process of claim 6 wherein (A)(1) is acrylonitrile.

8. The process of claim 7 wherein (B)(1) is acrylonitrile.

9. The process of claim 8 wherein (B)(3) is methyl acrylate.

10. The process of claim 9 wherein (B)(4) is a rubbery copolymer of butadiene.

* * * * *